Patented July 8, 1952

2,602,792

UNITED STATES PATENT OFFICE 2,602,792

1-CARBOCYCLICCARBAMYL-4-HETERO-CYCLIC-PIPERAZINES

Hugh Wendell Stewart, Plainfield, N. J., assignor to American Cyanamid Company, New York, N. Y., a corporation of Maine No Drawing. Application November 24, 1950, Serial No. 197,503

9 Claims. (Cl. 260—250)

The present invention relates to 4-carbocyclic-carbamyl-1-heterocyclic piperazines. More particularly, it is concerned with a novel group of 1,4-disubstituted piperazines having a

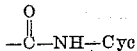

group in the 4-position and a nitrogen-containing heterocyclic substituent in the 1-position. The invention is also concerned with the preparation of the compounds themselves.

More specifically, the present invention relates to compounds capable of representation by the following generic formula:

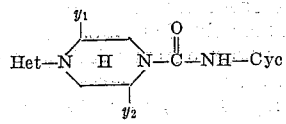

wherein Het represents a pyridyl, pyrimidyl or pyrazinyl radical, $y_1$ and $y_2$ represent hydrogen or methyl, and Cyc represents a cyclohexyl, phenyl or naphthyl radical or an alkyl-, halogen-, or alkoxy-substituted phenyl radical. The bond from the nitrogen in the 1-position in the piperazine ring must be to a carbon adjacent to a heterocyclic nitrogen in the Het grouping.

The compounds of the present invention, being 1,4-substituted piperazines, the piperazine ring is shown as saturated. However, in addition to the 1,4-substituents, the carbon atoms of the piperazine ring may be substituted, as shown at $y_1$ and $y_2$. Either $y_1$ or $y_2$ or both may be hydrogen or methyl. The invention, therefore, contemplates 1,4-disubstituted mono- and dimethyl piperazines.

The compounds of the present invention, therefore, may be classified as carbocyclic-carbamyl piperazines. In general, they comprise white crystalline materials. The compounds are, in general, only slightly soluble in water, ordinary ether and petroleum ether, but readily soluble in the ordinary alkanols. Compounds of the present invention in general have anticonvulsant properties. They exhibit distinct possibilities as pharmacologically-active compounds for this purpose.

Preparation of compounds typical of the present invention is more fully shown in the following example which is given as illustrative only and not by way of limitation. All parts are by weight unless otherwise noted.

EXAMPLE 1

*1-(2-pyridyl)-4-cyclohexylcarbamylpiperazine*

A solution of 19 parts of cyclohexyl isocyanate in 70 parts of dry diethyl ether is slowly added with cooling, over a period of about 15 minutes, to a solution of 25 parts of 1-(2-pyridyl) piperazine in 140 parts of dry ether. The white solid which precipitates is isolated by filtration and may be crystallized from naphtha. Pure, it melts at 138.5°–139.5° C.

By using the above procedure, substituting therein (a) an equivalent amount of a 1-heterocyclic piperazine shown in column 1 of the following Table I for the 1-(2-pyridyl) piperazine of the above example and (b) substituting an equivalent amount of corresponding isocyanate listed in column 2 of Table I for the cyclohexyl isocyanate, the compounds listed in column 3 of the table are obtained. Their melting points are given in column 4.

TABLE 1

| 1-Heterocyclic-piperazine | Isocyanate | Product | M. P. in °C. |
|---|---|---|---|
| 1-(2-pyrazinyl)-piperazine | phenyl | 1-(2-pyrazinyl)-4-phenyl-carbamylpiperazine | 145–146 |
| 1-(2-pyrimidyl)-piperazine | o-chlorophenyl | 1-(2-pyrimidyl)-4-(o-chlorophenylcarbamyl)piperazine | 122–123 |
| Do | p-bromophenyl | 1-(2-pyrimidyl)-4-(p-bromophenylcarbamyl)piperazine | 198.5–199.5 |
| Do | p-tolyl | 1-(2-pyrimidyl)-4-(p-tolylcarbamyl)piperazine | 175.5–176.5 |
| Do | alphanaphthyl | 1-(2-pyrimidyl)-4-(alpha-naphthylcarbamyl)piperazine | 208–209 |
| 1-(2-pyridyl)-piperazine | betanaphthyl | 1-(2-pyridyl)-4-(betanaphthylcarbamyl)piperazine | 189.5–191 |
| Do | p-phenetyl | 1-(2-pyridyl)-4-(p-phenetylcarbamyl)piperazine | 183–184.5 |
| Do | m-chlorophenyl | 1-(2-pyridyl)-4-(m-chlorophenylcarbamyl)piperazine | 153–154 |
| 1-(2-pyrazinyl)-piperazine | cyclohexyl | 1-(2-pyrazinyl)-4-cyclo-hexylcarbamylpiperazine | 170–171 |
| 1-(2-pyrimidyl)-piperazine | do | 1-(2-pyrimidyl)-4-cyclohexylcarbamylpiperazine | 167–168 |
| 1-(2-pyridyl)-piperazine | o-chlorophenyl | 1-(2-pyridyl)-4-(o-chlorophenylcarbamyl)piperazine | 131.5–133 |
| 1-(2-pyrimidyl)-piperazine | m-chlorophenyl | 1-(2-pyrimidyl)-4-(m-chlorophenylcarbamyl)piperazine | 173.5–174 |

In the foregoing example, all of the products were prepared by a reaction which can be generally represented in the following way:

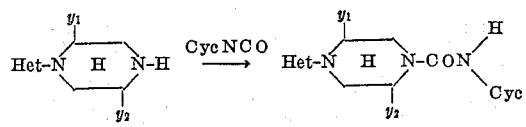

While this reaction is of general utility, certain precautions must be noted with regard to its use.

In most instances this general reaction is exothermic. However, the exothermic character of the reaction may be controlled readily by cooling the reaction mixtures, by regulating the rate of mixing of the two reactants, and by using a solvent and/or diluent for the reaction. Though no solvent need be used for the reaction, we prefer to use a solvent for several reasons. A solvent, acting also as a diluent, makes the exothermic character of the reaction more easily controllable. The proper choice of a solvent is also advantageous in keeping the reactants dissolved while allowing the product to crystallize freely in a relatively pure state as the reaction proceeds.

Though a wide variety of materials, such as petroleum ether, naphtha, benzene, toluene, chlorobenzene, dioxane, chloroform, pyridine, and the like, may be used as solvents for the above general reaction, a dialkyl ether, such as diethyl ether, dibutyl ether and the like is preferable. These ether solvents are particularly effective in dissolving both of the reactants and yet allowing the product of the reaction to crystallize freely as it is formed.

In general, the temperature at which this general reaction may be carried out is not critical. If necessary it may be carried out between 0° C. and the boiling point of the solvent. However, for practical reasons, the temperature range of about 0° C. to 35° C. is to be preferred.

Isolation of the product from the reaction mixture is readily accomplished. Since the product crystallizes in a relatively pure form directly from the reaction mixture, it may be isolated simply by filtration. If it is desirable to have the product in a state of higher purity than it is after isolation, the product may be recrystallized from a suitable solvent, such as naphtha, or a mixed solvent, such as alcohol-ether.

In addition to the above general type reaction in which a 1-heterocyclic piperazine is treated with a carbocyclic isocyanate to give the desired compounds of this invention, 4-carbocyclic-carbamyl-1-heterocyclic piperazines, there are several other general methods by which these compounds may be prepared. Three of these general methods are sketched as follows (wherein X represents halogen):

(1) 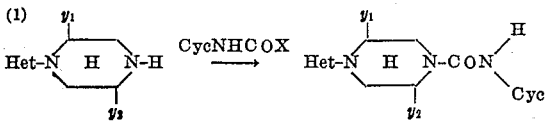

(2) 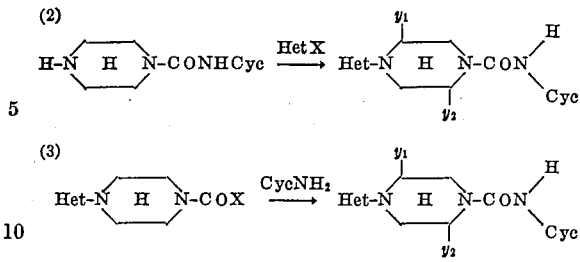

(3) 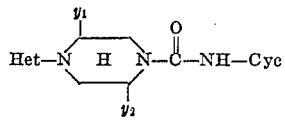

Though, in the preparation of specific compounds, one of these methods may be preferable, in general the starting materials for these methods are less readily available than the materials for the previously described method. It is primarily because of this that the previously described method is to be preferred.

I claim:

1. A 1-heterocyclic piperazine of the formula wherein Het is a radical selected from the group consisting of the pyridyl, pyrimidyl and pyrazinyl radicals; $y_1$ and $y_2$ are selected from the group consisting of hydrogen and methyl; Cyc is selected from the group consisting of the cyclohexyl, phenyl and naphthyl radicals and the alkyl-, halogen-, and alkoxy-substituted phenyl radicals; and the bond from the nitrogen in the 1-position in the piperazine ring is to a carbon adjacent to a heterocyclic nitrogen in the Het- grouping.

2. A 1-heterocyclic piperazine according to claim 1 in which Het is a pyridyl radical.

3. 1-(2 - pyridyl)-4-cyclohexylcarbamylpiperazine.

4. 1 - (2-pyridyl)-4-(o-chlorophenylcarbamyl)-piperazine.

5. A 1-heterocyclic piperazine according to claim 1 in which Het is a pyrimidyl radical.

6. 1 - (2 - pyrimidyl) - 4 - cyclohexylcarbamyl-piperazine.

7. 1-(2-pyrimidyl)-4-(o - chlorophenylcarbamyl)-piperazine.

8. A 1-heterocyclic piperazine according to claim 1 in which Het is a pyrazinyl radical.

9. 1-(2-pyrazinyl) - 4 - phenylcarbamylpiperazine.

HUGH WENDELL STEWART.

No references cited.